United States Patent [19]

Gavagan et al.

[11] 4,015,094
[45] Mar. 29, 1977

[54] SAFETY SEAT BELT BUCKLE SWITCH WITH COIL SPRING CONTACT

[75] Inventors: James A. Gavagan, Center Line; Carl Mogens Petersen, III, Pontiac, both of Mich.

[73] Assignee: Irvin Industries, Inc., Greenwich, Conn.

[22] Filed: Sept. 12, 1975

[21] Appl. No.: 612,856

Related U.S. Application Data

[62] Division of Ser. No. 439,732, Feb. 5, 1974, abandoned.

[52] U.S. Cl. .................. 200/61.58 B; 200/276; 24/230 A
[51] Int. Cl.² ........................................ H01H 3/20
[58] Field of Search ............ 200/61.58 B, 276; 24/230 A

[56] References Cited

UNITED STATES PATENTS

| 2,567,421 | 9/1951 | Brantingson | 200/276 UX |
| 2,773,963 | 12/1956 | Mathews | 200/276 |
| 3,833,781 | 9/1974 | Rumpf | 200/61.58 B |
| 3,956,603 | 5/1976 | Fisher | 200/61.58 B |

Primary Examiner—James R. Scott
Attorney, Agent, or Firm—McAulay, Fields, Fisher & Goldstein

[57] ABSTRACT

A self-sufficient three-piece structure constituting an open top metal housing within which there is mounted a pushbutton lever and a V-shaped leaf-type spring between lever and base of housing. A single plastic insert providing a crush resistent wall between base of housing and plastic cover also holds an electrical switching arrangement. The electrical switching arrangement includes a rotatable shaft and a radially outward extending finger which is actuated by insertion of the mating clip.

2 Claims, 15 Drawing Figures

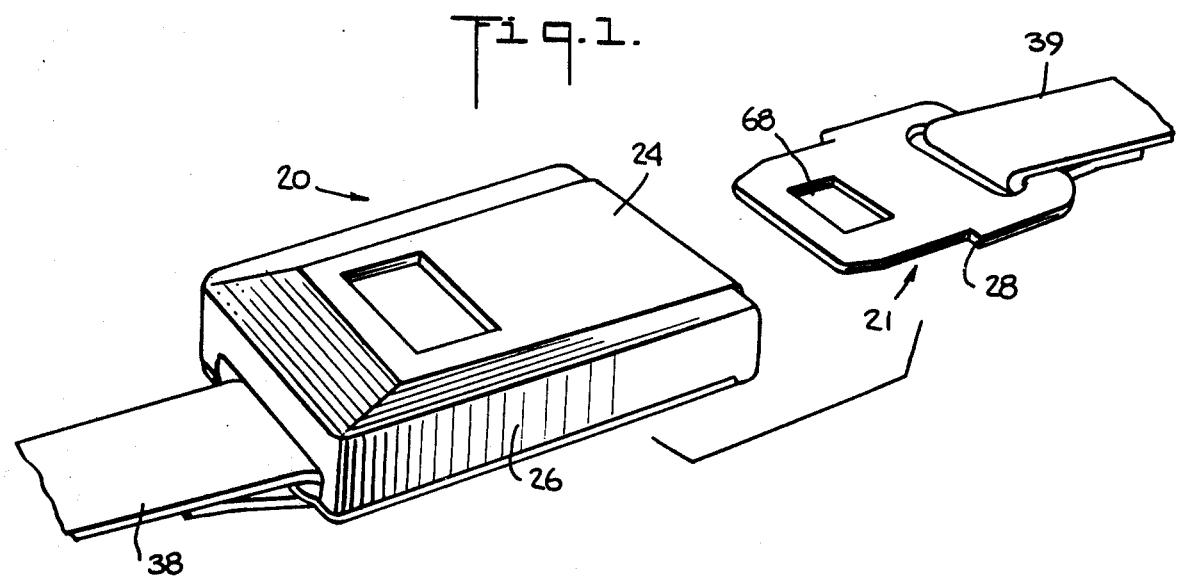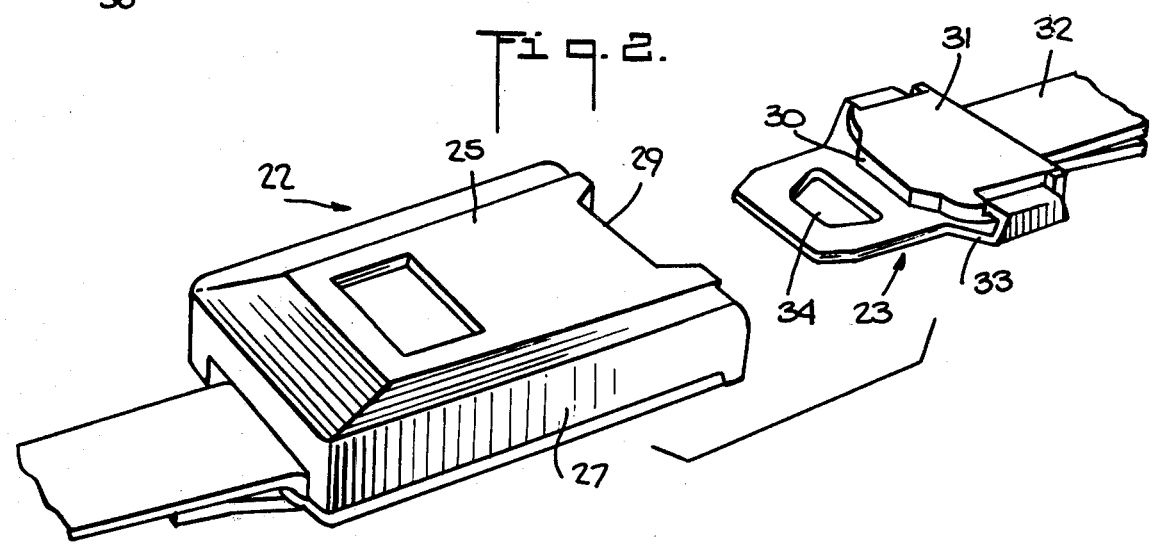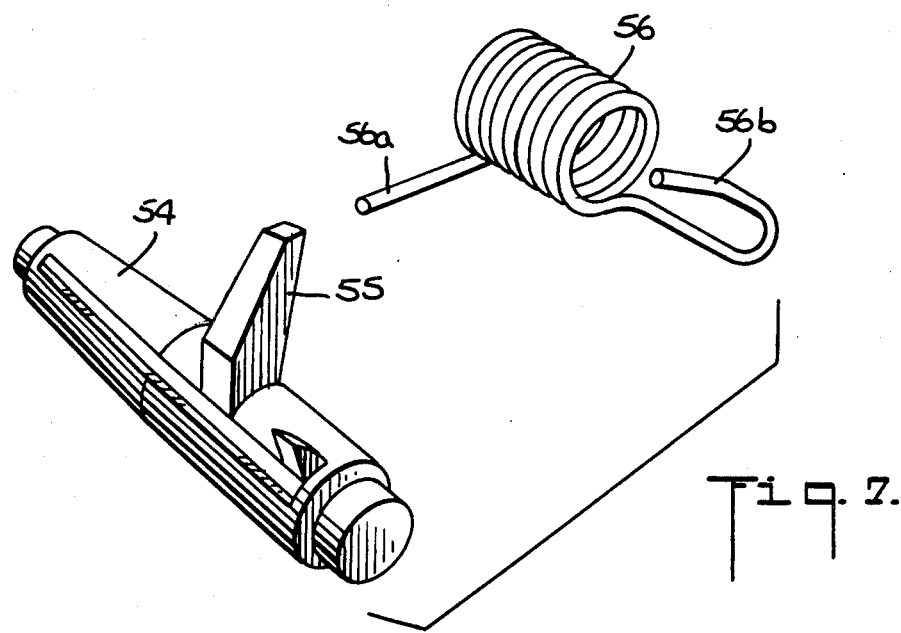

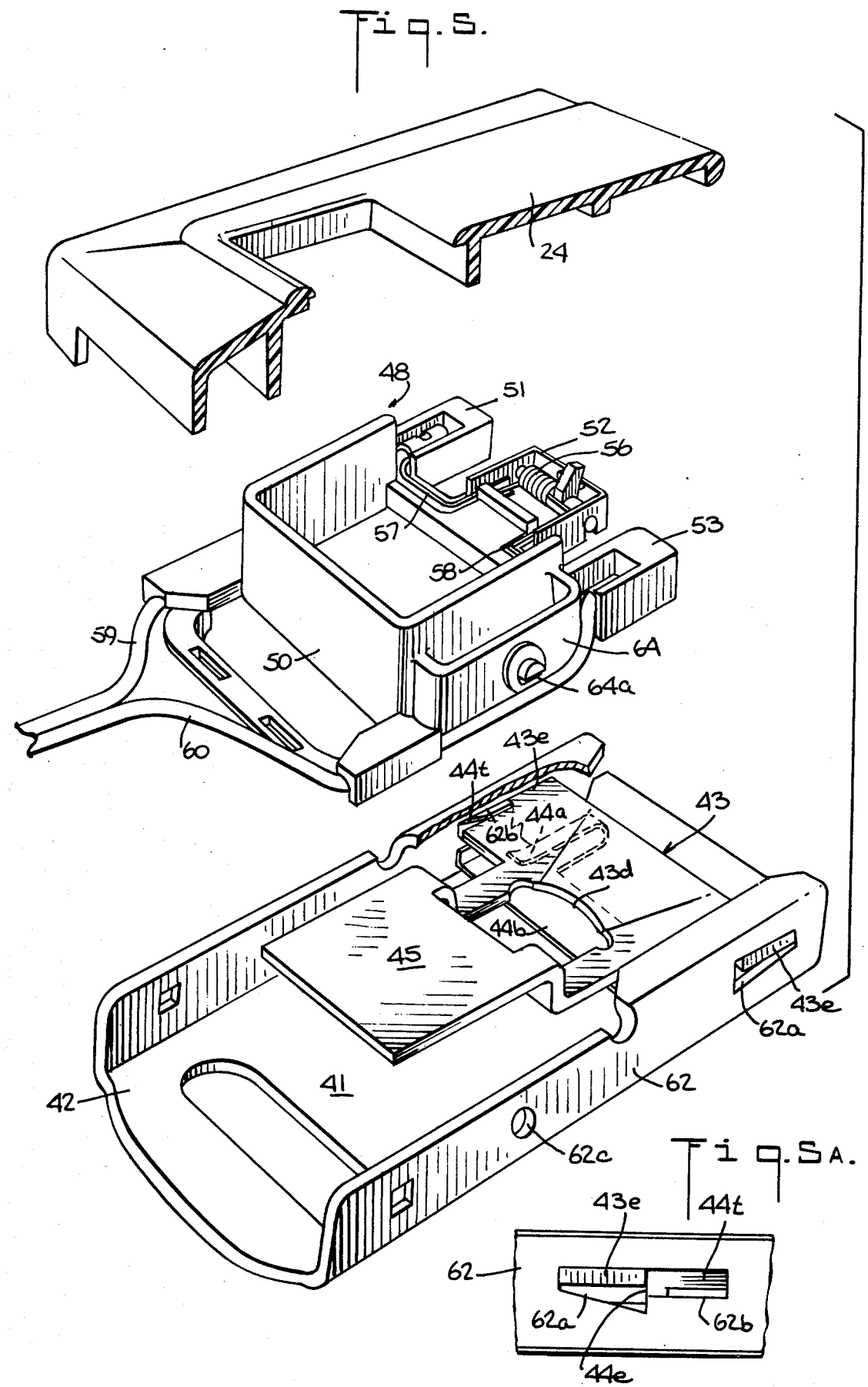

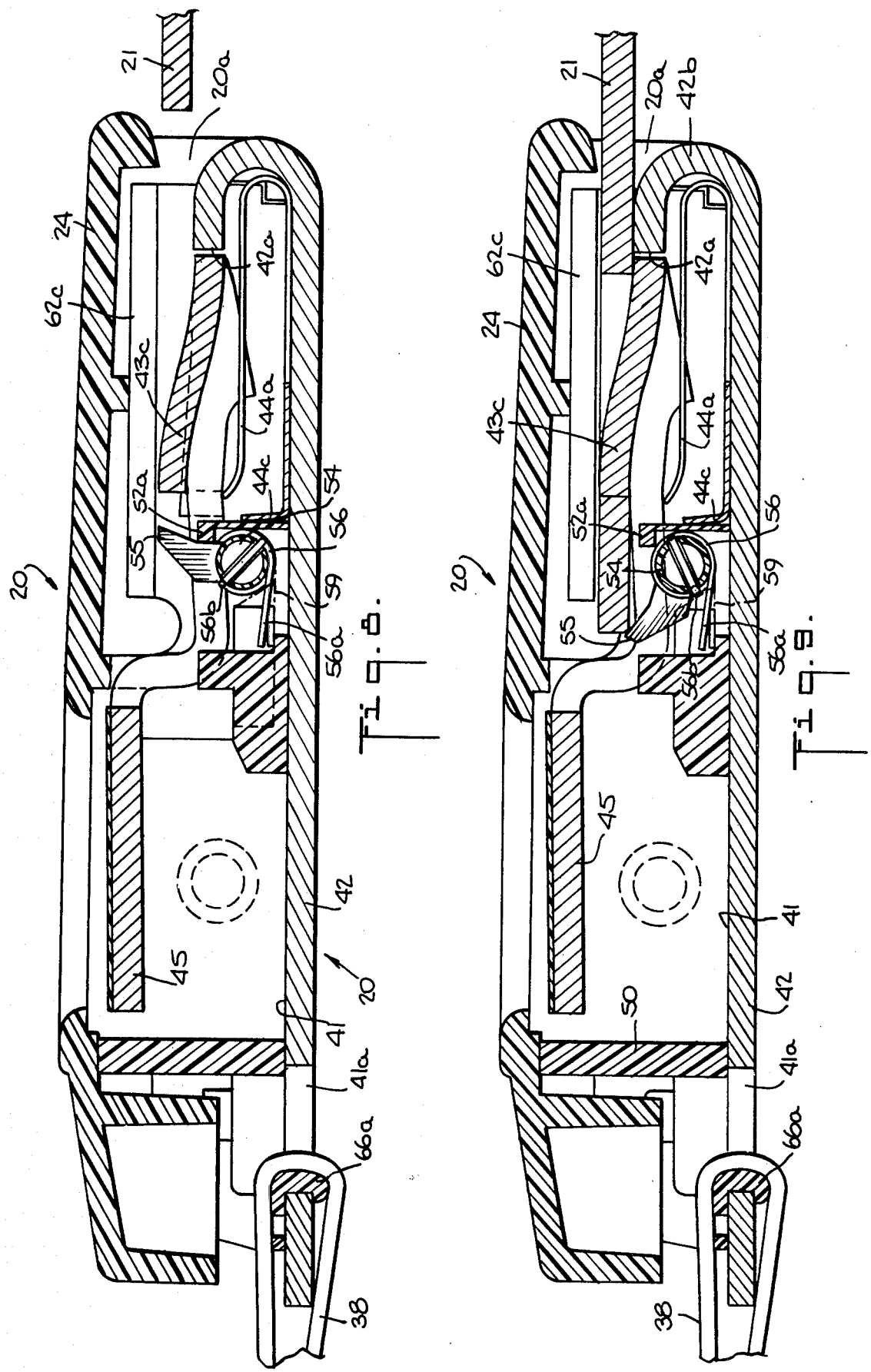

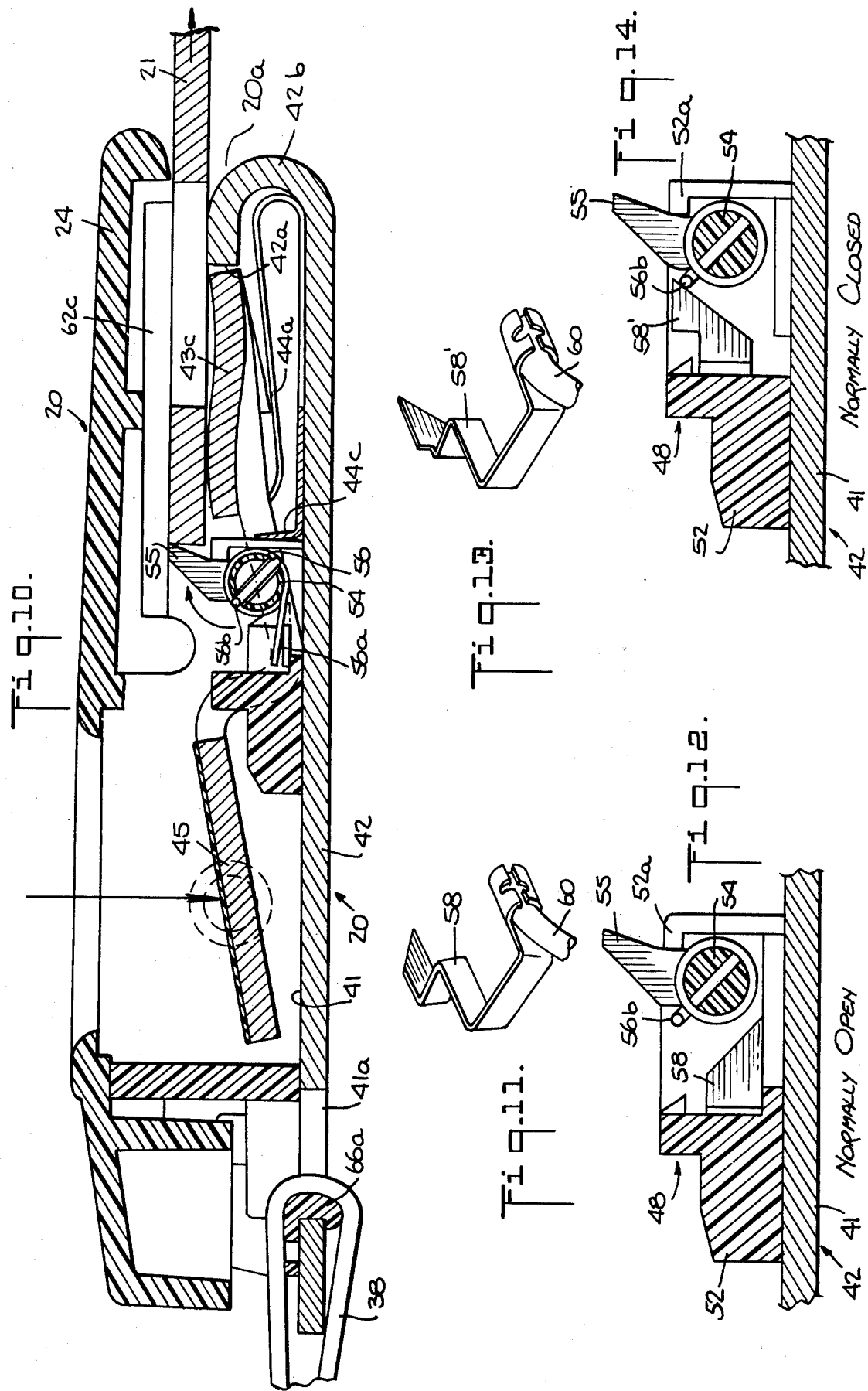

SAFETY SEAT BELT BUCKLE SWITCH WITH COIL SPRING CONTACT

This is a division, of application Ser. No. 439,732, filed Feb. 5, 1974, now abandoned.

BACKGROUND OF THE INVENTION

This invention relates in general to safety seat belt buckles and, more particularly, to a design which provides an optimum combination of design features and parameters to provide a functional combination of high strength, small size, low weight, ease of use and versatility in use together with a reasonable cost to manufacture.

There are a large number of safety seat belt designs which have been used and are being used as well as a large number of designs that have been proposed and are known in the art. It is simple enough to design a buckle to readily meet any one or two given functional criteria as long as other functional criteria are sacrificed. However, as a practical matter there must be a trade-off between such characteristics as low weight and small size on the one hand and structural strength on the other hand. Ease and cost of manufacture is another feature which must be traded off against both weight and size as well as against strength. Other important functional features are ease of manipulation so that the passenger or driver can readily buckle and unbuckle when required. Furthermore, since the use of a seat belt requires some degree of minimum acceptance by the riding public, aesthetic features and simplicity in use as well as weight and size are factors to take into consideration in any given design in order to enhance the likelihood that as large a number of users as possible will in fact use the seat belt rather than try to defeat any system in which the seat belts are used.

Accordingly, the main purpose of this invention is in a seat belt buckle design that provides an optimum combination of parameters that include weight, strength, size, ease of use, reliability, and ease and cost of manufacture.

It is a further purpose of this invention to provide a basic seat belt buckle design which has versatility in that (a) it can be used for a seat belt buckle which either incorporates or omits an electrical switch for an interlock system and (b) it can be used either for a center seat buckle or an outboard seat buckle wherein these two buckles are designed to prevent improper hookup of an outboard seat buckle with a center seat clip and prevent improper hookup of a center seat buckle with an end seat clip. In effect, versatility is another parameter which is part of the optimum combination of parameters to which this invention is addressed.

BRIEF DESCRIPTION OF THE INVENTION

In brief, this invention employs a metal housing within which there is mounted a pushbutton lever, a V-shaped leaf type spring to bias said lever into an upward position, and a single plastic insert for holding an electrical switching arrangement and to provide a crush resistant wall between a plastic cover and the housing. Primarily because of the crush resistant wall on the plastic insert, the cover is designed so that it does not bear or have to resist any significant loading forces. The cover can thus be varied for aesthetic purposes or for the purpose of making sure that the center seat buckle and clip are noncompatible with the outboard seat buckle and clip. The pushbutton lever has sufficient mechanical advantage so that the wearer can readily release the clip and buckle even when there is considerable tension in the webbing to which the clip and buckle are connected. A coil spring loaded rotatable shaft having a radially extending finger serve to make or break the electrical switch connection. The finger is engaged by the leading edge of the clip during buckling and causes the shaft to which it is connected to rotate so that one of the coil spring ends is brought into contact with the electrical circuit to complete the circuit indicating that the buckling has occurred.

BRIEF DESCRIPTION OF THE DRAWINGS

FIG. 1 is a perspective view showing an assembled buckle and an associated clip of a first embodiment of this invention.

FIG. 2 is a perspective view showing an assembled buckle and associated clip of a second embodiment of this invention; the difference between the embodiments shown in FIGS. 1 and 2 being in the buckle cover and in the clip configuration.

FIG. 3 is a perspective view of the buckle of this invention with the cover removed.

FIG. 5A is a partial view illustrating the relationship of a housing wall opening and lever tabs.

FIG. 7 is a perspective blow-up view of the rotatable shaft and biasing spring mounted thereon which spring also operates to provide an electrical contact.

FIG. 8 is a longitudinal cross-section through the buckle in the unbuckled state.

FIG. 9 is a longitudinal cross-section through the buckle showing the condition where the clip has been inserted and thus is the buckled state.

FIG. 10 is a longitudinal cross-section similar to that of FIGS. 8 and 9 showing the release lever depressed and the clip being ejected from the buckle.

FIGS. 11 and 12 represent a first embodiment of the electrical contact arrangement in which the contact is normally open during the unbuckled state; FIG. 11 showing a perspective view of the contact and FIG. 12 showing a cross-sectional view through the rotatable shaft and operative finger attached thereto.

FIGS. 13 and 14 are similar to that of FIGS. 11 and 12 except that they represent a second embodiment of the contact arrangement wherein the electrical contact is normally closed during the unbuckled state.

DESCRIPTION OF THE PREFERRED EMBODIMENTS

Figure 4:
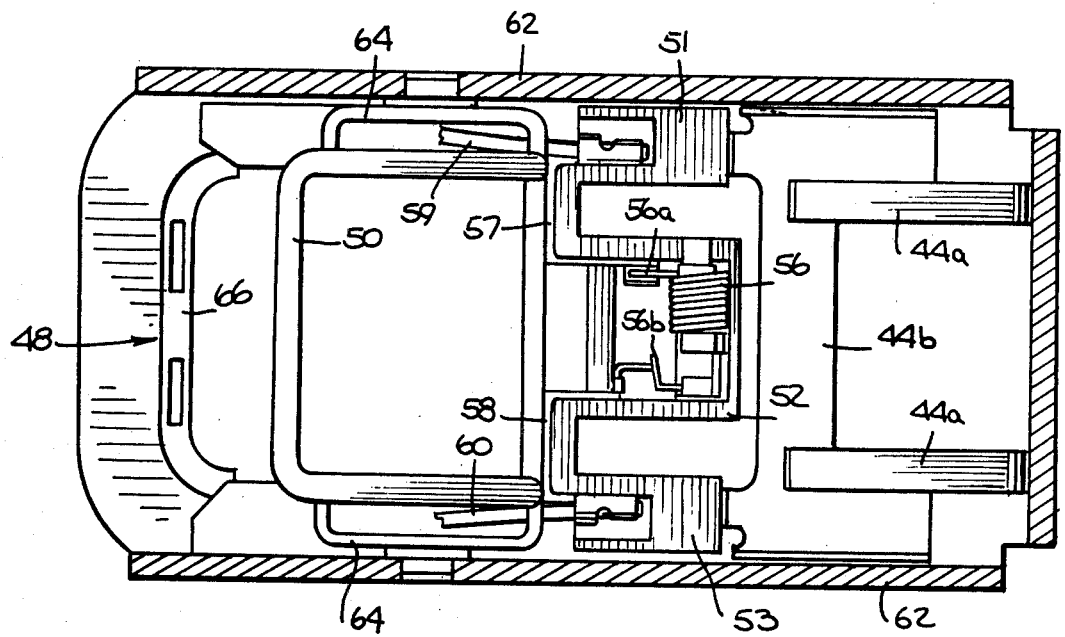
FIG. 4 is a plan view of the FIG. 3 buckle in partial cross section with the cover removed and without the push button release lever thereby showing the spring underlying the lever and the electrical connections used to indicate that buckling has been completed.

FIGS. 1 and 2 illustrate one of the advantages of the basic buckle design of this invention. FIG. 1 shows a buckle 20 and associated clip 21 for an outboard seat while FIG. 2 represents a buckle 22 and associated clip 23 for a center seat. The arrangement shown prevents incorrect buckling of a clip with a buckle for which it is not associated. Yet both buckles use the same basic structure, the most significant difference between the buckle 20 and the buckle 22 being in the covers 24 and 25 respectively. One of the advantages of this invention is that the buckle cover design can be substantially ornamental because it is not load bearing nor does it provide support or positioning for the components of the buckle. Thus, the cover 24, 25 can be designed to provide a new functional feature which is to avoid the improper buckling of dissociated clip and buckle.

Comparing the FIG. 2 arrangement to the FIG. 1 arrangement, the housing 27 of the FIG. 2 buckle is slightly longer than the housing 26 of the FIG. 1 buckle so that the shoulder 28 of the clip 21 will abut against the forward end of the housing 27 and thus prevent latching of the clip 21 in the buckle 22. The FIG. 2 cover 25 has a recessed forward end 29 which mates with a forward projection 30 of a housing 31 on the clip 23. This housing 31 covers the usual friction holding roll (not shown) that is required to permit adjusting the length of the belt strap 32 on the center seat. Since the center seat is not designed with a retractor this older method of adjusting belt 32 length has to be employed and thus the housing 31 exists as a base for providing the additional mating projection 30. Because the shoulder 33 of the clip 23 is further back from the latching opening 34 of the clip 23 than is the case of the FIG. 1 clip, the FIG. 2 clip 23 can proceed further into the buckle housing 27 than can the FIG. 1 clip 21. But because of the projection 30 on the FIG. 2 clip 23, the FIG. 1 buckle cover 24 will prevent the FIG. 2 clip 23 from extending sufficiently far into the FIG. 1 buckle 20 to latch.

The rest of the figures all relate to the same embodiment with a minor exception as to an electrical contact mechanism as shown in FIGS. 13 and 14. A basic terminology usage herein should be defined. As used herein, the forward end of the buckle is considered to be the end having the opening that admits the clip. Thus, the back end of the buckle 20 is the end which is attached to the buckle strap 38. Similarly, the front end of the clip 21 is considered herein to be the end that enters the front end of the buckle 20 while the back portion of the clip 21 is the portion to which the clip strap 39 is connected. The top of the buckle 20 is considered to be the cover 24 while the base or bottom is the opposite surface, which is the main surface 41 of the housing 42. Thus when a first element is described as being above a second element, that means the first element is close to the cover 24 than is the second element.

Figure 6:
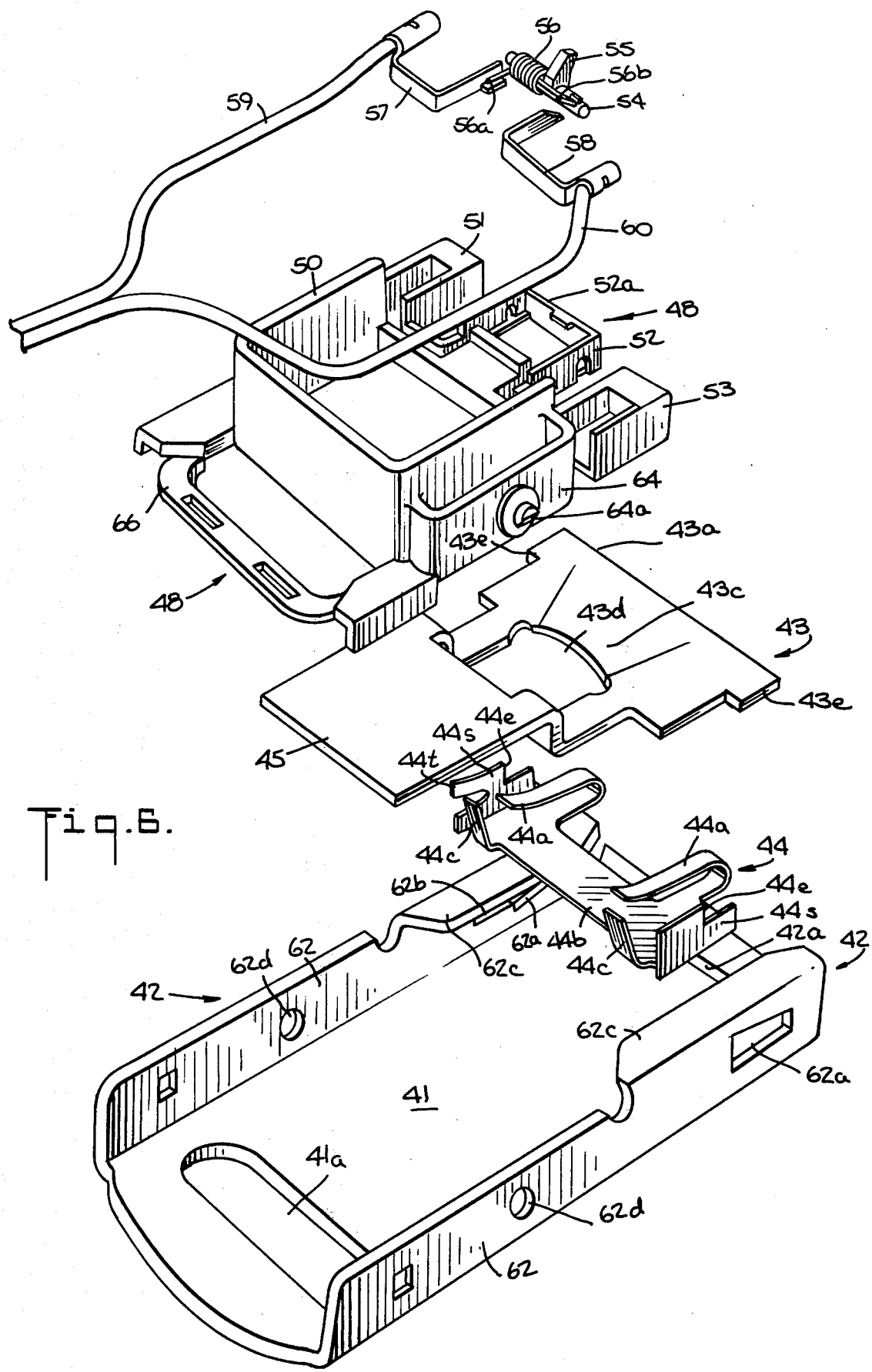
FIG. 6 is a perspective blow-up, excluding the cover, of the five remaining major elements of the buckle; namely from top to bottom, the electrical connection arrangement, the crush bar member, the lever, the spring and finally the housing.

The buckle 20 is composed of a housing 42 within which there is mounted a manually operated lever 43 and a generally V-shaped leaf spring 44 (best seen in FIG. 6). The leaf spring 44 is positioned between the housing base 41 and the forward portion of the lever 43. The spring 44 biases the lever 43 into its normally up position. The lever 43 can be depressed toward the housing base 41 only so long as user digital pressure is maintained on the pushbutton 45 portion of the lever 43.

The lever 43 has a forward edge 43a, two sidewardly extending ears 43e, a clip engaging latch portion 43c, an opening 43d rearward of the latch portion 43c and the substantially horizontal pushbutton portion 45. The lever ears extend into pie-shaped openings 62a in the side wall 62 of the housing 42.

As a further matter of terminology, the term horizontal is used herein to denote substantial parallelism to the base 41 and the term vertical denotes substantial perpendicularity to the base 41.

In addition, a plastic crush bar unit 48 is mounted in the housing 42 rearward of the leaf spring 44. This unit 48 includes a three-sided U-shaped wall 50 positioned around the pushbutton 45 and extending from the housing base 41 to slightly above the plane of the pushbutton 45. This wall 50 will take any loading that may be applied between the cover 24 and the housing 42 thereby providing a crush resistent buckle design. By employing this wall 50 to give the crush resistent parameter, the cover 24 can be designed and is designed without requiring the structural strength that would otherwise be required if the cover 24 had to be relied on to provide the crush resistent parameter. Thus, the alternate cover design shown in FIG. 2 is facilitated.

The unit 48 has three forwardly projecting legs 51, 52 and 53. A small rotatable shaft 54 is mounted on the center leg 52. A finger 55 extends out from this shaft 52. A coil spring 56 is mounted on the shaft 54 and engages the shaft 54 (as shown in FIG. 6) so as to bias the shaft to a rotational position where the finger 55 extends upward (see FIGS. 3 and 8). When so biased, the finger 55 is rotated against an end wall 52a of the center leg 52 thereby preventing further rotation of the shaft 54 and causing the finger 55 to normally project above the wall 52a. When the clip 21 is inserted into the buckle 20, the leading edge of the clip will abut against the forwardly facing side of the finger 55 forcing the finger 55 back thereby rotating the shaft 54 and the coil spring 56 mounted thereon. The two U-shaped electrical connections 57, 58 are positioned so that the connection 57 is in continuous contact with one end 56a of the coil spring 56 (see FIG. 6). The other end 56b of the coil spring 56 is normally in the open position shown in FIG. 12. But, when the finger 55 is moved back causing the shaft 54 and coil 56 to rotate (counterclockwise as seen in FIG. 12), the end 56b rotates down into contact with the second connection element 58 thereby completing an electrical circuit through the buckle 20 from the wire 59 to the wire 60.

Figure 5:
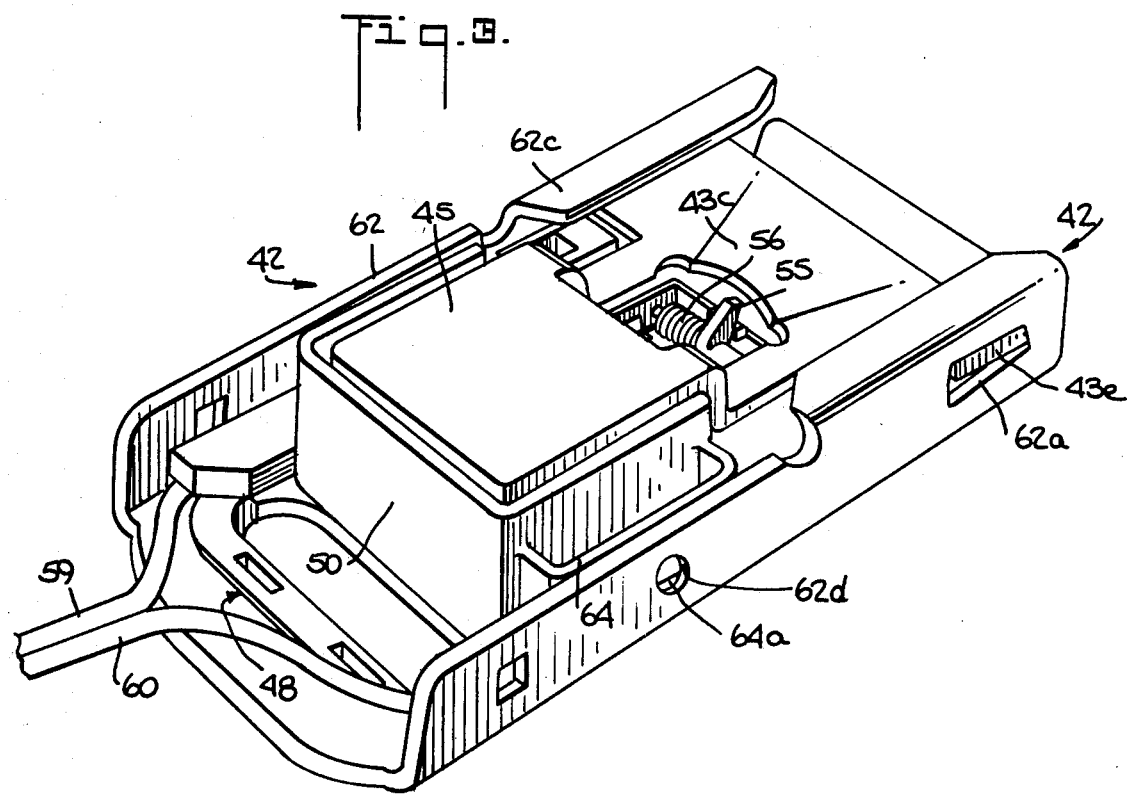
FIG. 5 is a perspective partial blow-up showing three portions of the buckle in blow-up fashion; the three portions being (a) the cover which is shown in partial cross section, (b) the crush bar member together with the electrical connections carried thereon, and (c) the housing with the release lever assembled thereon and the spring, in invisible lines, beneath the lever.

As shown in FIGS. 6, 8 and 9, the leaf spring 44 has a base porton 44b which rests against the housing base 41 and two upward and rearward extending arms 44a which bear against the under surface of the lever 43 thereby biasing the lever 43 into its normal upward position. The leaf spring 44 has two upwardly bent side walls 44s which bear against the inner surface of the housing side walls 62 of the housing 42 to position the spring 44 laterally and hold the spring 44 from rattling. Two resilient vertical walls 44c at the back of the leaf spring 44 abut against the crush bar unit 48 and aid in holding snug the parts within the buckle. A tab 44t is bent out from one of the leaf spring side walls 44s to catch into an opening 62b (see FIG. 5A) in the housing 42 side walls 62 and thereby retain the leaf spring 44 against longitudinal movement backward within the housing 42. The opening 62b is an extension of one of the two pie-shaped openings 62a to provide a total opening on one side wall 62 great enough to permit assembling the lever 43 into the housing 42. As shown in FIG. 5A, the spring side walls 44s are stepped to provide a vertical edge 44e. This edge 44e, at least at the opening 62b, holds the lever ear 43e against longitudinal movement back within the opening 62b.

The steel lever 43 includes two sidewardly projecting ears 43e at the front end thereof. These ears fit within the pie-shaped openings 62a of the steel housing side wall 62. The upward limit of rotation of the lever 43 is determined by contact between the ears 43e and the upper edges of the openings 62a. At least nominally, forward movement of the ears 62a is determined by the forward edges of the openings 62a. However, the rearward edge 42a of the J-shaped front section of the housing 42 is positioned sufficiently close (10 to 30 mils in one embodiment) to the forward edge 43a of the lever so as to carry a part of the load on the lever 43 when a clip is locked in and exerts a large forward force on the lever 43. This relationship of housing edge 42b to lever edge 43a tends to minimize bowing of the lever 43 under high loads because as the lever 43 deflects under high loads, the J section 42b takes up the load and distributes the load over the entire front edge 43a of the lever.

The crush bar unit 48 in addition to the three wall crush bar 50 and the three forwardly projecting legs 51, 52, 53, also includes two resilient side walls 64. These side walls 64 are integral with the plastic unit 48 but these side walls 64 have a thickness such that they will flex laterally sufficient to permit snapping of the plastic unit 48 into the metal housing 42 by virtue of engagement between side projection 64a on each side wall 64 and openings 62d on each housing side wall 62. The projection 64a are bevelled on the underside so as to facilitate pushing the unit 48 into the housing 42 and so that the projections 64a can ride down the inner surface of the side walls 62 until they snap into the opening 62b.

This crush bar unit 48 also contains a back member 66 which member 66 includes sections 66a that are somewhat U-shaped in cross section so that the sections 66a engage the rear wall of the opening 41a in the base of the housing 42, through which opening 41a the buckle strap 38 is looped for attachment to the buckle 20. Thus, the buckle strap 38 (see FIG. 8) loops around the plastic section 66a and does not directly impinge on the metal wall for the opening 41a. This provides a degree of protection from abraiding and excess local tension on the strap 38.

An acetyl copolymer resin is used for the plastic crush bar unit 48.

In operation, and with particular reference to FIGS. 8, 9 and 10, the buckle 20 in normal unbuckled state is shown in FIG. 8, the buckle 20 in normal buckled state is shown in FIG. 9 and the buckle while the clip is being unbuckled or unlatched is shown in FIG. 10. When the clip 21 is inserted into the front opening 20a of the buckle 20, it is guided by the J-shaped front end 42b of the housing and is held down by inwardly extending flanges 62c of the front part of the housing side wall 62. Thus, the clip 21 is constrained to contact the rearwardly and slightly upwardly sloping latch portion 43c of the lever 43. The inward progression of the clip 21 forces the lever 43 to pivot down around a line that is approximately at the contact between the ears 43e and the forward edge of the openings 62a in the side wall 62. When the clip 21 has ridden in far enough, the clip opening 68 will be engaged by the rearwardly facing shoulder of the latch portion 43c permitting the lever 43 to snap back up to the position shown in FIG. 9 and thereby positively hold in the clip 21. At the same time, as disclosed above, the forward end of the clip 21 contacts the upwardly extending finger 55 causing it to rotate counterclockwise as seen in the drawings and causing the terminals 58 and 56b to contact thereby completing an electric circuit and providing an indication that the clip 21 is indeed latched into the buckle 20 and thus that the occupant is buckled up. It will be noted that the finger 55 projects up through the opening 43d immediately rearward of the latch portion 43c so that the clip 21 will contact the finger 55 during insertion.

One advantageous feature of the finger 55 design and arrangement shown can best be understood with reference to FIG. 10. On release of the clip 21, the passenger depresses the push button 45 portion of the lever 43 thereby bringing the latch portion 43c below the lever of the clip 21 so that the clip 21 can be pulled out. However, in addition, the finger 55 is biased by the spring 56 to move in a clockwise direction. Thus, as may be seen in FIG. 9, the finger 55 exerts a small upward and backward pressure on the clip 21. This pressure has no effect during the buckled state except perhaps to better seat the clip 21 against the rearwardly facing edge of the latch 43c. However, once the lever 43 and its latch 43c has been moved out of the way, the relatively small pressure exerted by the finger 55 meets no resistance and thus tends to move the clip 21 out of the buckle 20. This not only provides an improved passenger feel for the releasing mechanism, but also aids to assure that the clip 21 does not sit in place and thus is not relatched upon release of the disengaging pressure on the push button 45.

FIGS. 13 and 14 illustrate an embodiment in which the normally open terminals 58 and 56b (as shown in FIGS. 11 and 12) are normally closed terminals 58' and 58b. The buckled-up state is thus indicated by the opening of an electric circuit rather than the closing of a circuit. Otherwise, this FIGS. 13 and 14 arrangement is the same as shown in the other FIGS. and the same reference numerals are therefore used.

An advantageous feature of the way in which the lever 43 and spring 44 are mounted in the housing 42 and in which they bear against one another is that these three units 42, 43 and 44 operate as a functional buckle regardless of the condition or even presence of the plastic unit 48 or plastic cover 24. Thus this design enhances safety on collision and extends effective life of the buckle.

What is claimed is:
1. A safety seat belt buckle comprising:
a buckle housing having a base and first and second opposed side walls,
a clip-holding latching lever having a push button releasing portion, said lever mounted for limited movement within said housing, said lever having a clip holding latch portion and an opening rearward of said latch portion,
a spring mounted between said lever and said base of said housing, said lever when depressed compressing said spring, said lever being held in a normal upward position by said spring,
the forward portion of said housing having guide means to receive a mating clip, a switch housing mounted in said buckle housing rearward of said latch portion of said latching lever, a transverse shaft mounted for rotation on said switch housing, a finger extending radially outward from said shaft, a coil spring mounted on said shaft to bias said shaft to a position, in a normal unbuckled state, in which said finger extends upward through said lever opening, said finger being pushed backward when an associated clip is inserted through said guide means causing rotation of said shaft prior to latching engagement between said clip and said latch portion, first and second electrical contacts incorporating respectively first and second ends of said coil spring, rotation of said shaft through backward movement of said finger changing the state of said first electrical contact, said first electrical contact comprising a stationary portion having a contact surface and a movable portion constituting said first end of said coil spring, movement of said shaft causing movement of said first end of said coil spring, said contact surface being oriented such that the axis of said first end of said coil spring remains substantially parallel to said contact surface during said movement of said first end so that engagement of said first end of said spring and said contact surface entails movement of said first end across said contact surface under pressure of said coil spring.

2. The buckle of claim 1 wherein: said finger maintains a spring loaded bias on said clip during the buckled state in aid of releasing said clip when said lever is depressed during unbuckling.

* * * * *